March 1, 1960
R. C. BAKER
2,926,523
ECONOMIZER UNIT FOR PNEUMATIC GAGING CIRCUITS
Filed May 29, 1957
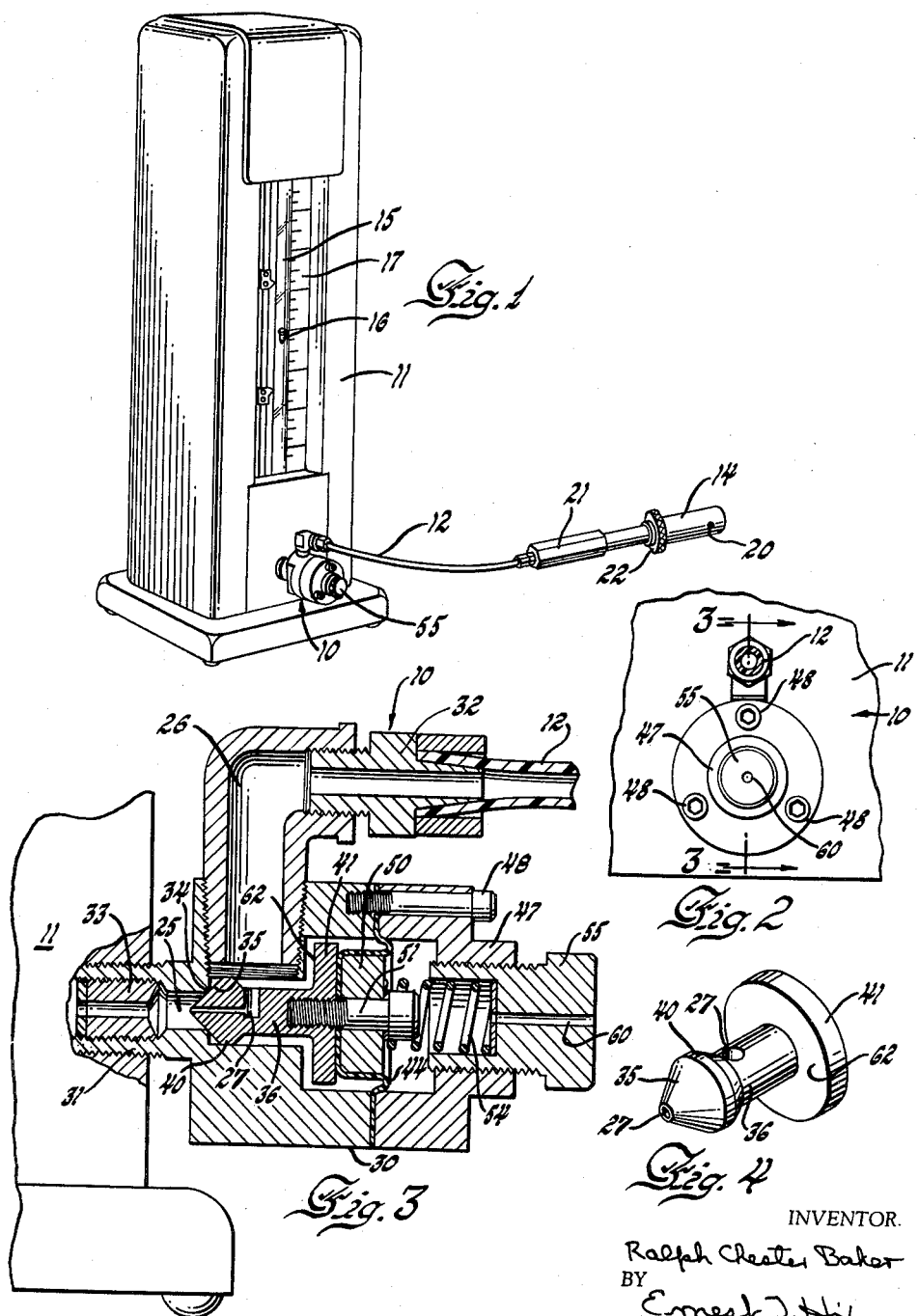
INVENTOR.
Ralph Chester Baker
BY
Ernest J. Hix
Atty.

United States Patent Office 2,926,523
Patented Mar. 1, 1960

2,926,523

ECONOMIZER UNIT FOR PNEUMATIC GAGING CIRCUITS

Ralph C. Baker, Dayton, Ohio, assignor to The Sheffield Corporation, Dayton, Ohio, a corporation of Delaware Application May 29, 1957, Serial No. 662,506

8 Claims. (Cl. 73—37.5)

This invention relates to gaging circuits of the pneumatic type.

It is an object of this invention to provide an improved compact and simply constructed unit for mounting in the flow path of a pneumatic gaging circuit to automatically reduce air consumption and noise when the circuit is not active in gaging, while providing full flow through the unit throughout the gaging range.

It is a further object to provide such a unit for ready placement in an existing circuit and having an inlet for connection to the outlet of a flow measuring instrument and an outlet for connection to a gage head providing relatively small resistance to fluid flow when not applied in gaging, the unit being automatically operative to reduce flow at a pressure level in the circuit below that existing during gaging and to provide free flow through the unit at pressures above that level and throughout the gaging range.

It is a further object to provide such a unit including valve means responsive to pressure obtained between the valve means and gage head, a continuous limited bleed being provided when the valve means is completely closed whereby, for example, in a circuit including a gage head having open orifices, application of a workpiece results in a reduction in flow through the gage head and an increase in pressure downstream of the valve means to fully open the valve means at a pressure level below the gaging range and maintain the valve means fully open at pressures thereabove.

Other objects and advantages of the invention will be apparent from the following description, the appended claims and the accompanying drawing, in which:

Fig. 1 is a perspective illustration of a gaging circuit including a unit embodying the present invention, Fig. 2 is a fragment illustrating a portion of the forward face of the instrument of Fig. 1, Fig. 3 is a sectional view of the economizer unit taken on line 3—3 of Fig. 2, and Fig. 4 illustrates in perspective the flow controlling member of the exemplary unit.

In gaging circuits of the pneumatic type having gage heads providing relatively small resistance to fluid flow when not applied in gaging, the amount of air flowing through the circuit is greater in non-gaging periods than when the circuit is being used. This usually results in continuous noise from the circuit and in plants having a number of such gaging circuits in operation, a problem of uneconomical and unnecessary consumption of compressed air.

The present invention provides a small, compact unit which can be readily inserted into existing circuits of this character to automatically reduce noise and unnecessary air consumption when the circuit is not active in gaging. While a particular construction has been illustrated for purpose of disclosing the present invention and a particular gaging application has been disclosed it will be understood that the invention is not limited to the details of the illustrated construction or the illustrated application.

The unit has special application for connection between the outlet of an air gaging instrument and the gage head of an existing circuit. In the illustrated application a unit 10 embodying the present invention is connected between the outlet of an air flow instrument 11 and a tube 12 leading to a diameter gaging spindle 14.

The particular illustrated instrument 11 is of a commercially available type adapted for connection to a source of compressed air and including a vertically disposed internally tapered flow tube 15 containing an indicating float 16 which is positioned within the tube and along scale 17 in accordance with the flow through the instrument. The exemplary spindle 14 is provided for gaging the diameter of a bore and is of the type having a pair of opposed open orifices controlled by the work, one of which is indicated at 20 in Figure 1. A handle 21 is provided for inserting and removing spindle 14 from the work and an adjustable flange 22 determines the distance the spindle is inserted into the bore to be gaged.

When spindle 14 is applied in gaging, that is, inserted within a bore of a workpiece, the flow through the orifices 20 is restricted and float 16 positions itself in accordance with the bore diameter. When spindle 14 is removed from the workpiece, there is relatively small resistance to fluid flow through the spindle and in systems of this nature flow is greater than that which exists during gaging. While unit 10 is shown connected to an instrument of the flow-type, it has equal application to instruments which operate on the "back-pressure" principle.

The details of the exemplary unit 10 are shown most particularly in the sectional view of Fig. 3. The unit includes valve means at 25 controlled by pressure in a conduit or passage 26 downstream of the valve means to open valve means 25 at a pressure level below the gaging range and above that existing when the flow through gaging head or spindle 14 is relatively unrestricted and to maintain the valve means closed at pressures below that level. A bleed passage is provided at 27 so that a sufficient flow is present to provide the pressure response and actuation of the valve means when valve means 25 is closed. The bleed passage is in effect in parallel to the passage containing valve means 25.

The unit comprises a body 30 having a threaded inlet connection at 31 for connection to instrument 11 and an outlet connection 32 for tube 12 leading to the gage head.

A restriction upstream of the valve means of the unit is necessary in each application. In this application a large size restrictor 33 is threaded into connection 31. In a "back-pressure" circuit the normal restrictor of the circuit performs the same function.

The valve means 25 includes an annular valve seat 34 and a cooperating annular flow controlling surface 35 on a flow controlling member 36. Member 36 has a portion 40 adjacent surface 35 slidably guided in body 30 and an enlarged piston-like actuating portion 41 adjacent its other end.

A flexible diaphragm 44 supporting the other end of member 36 is in sealed relation between body 30 and enlarged portion 41 of member 36. Diaphragm 44 is clamped between the main portion of body 30 and a retainer 47 forming a part of the body by screws 48. It is connected to member 36 by a washer 50 and bolt 51. Spring 54 cooperates between an adjustment 55 threaded into retainer 47 and washer 50, acting against member 36 to urge flow-controlling surface 35 into flow restricting engagement with seat 34. In this embodiment adjustment 55 has a passage 60 communicating with atmosphere so that the enlarged portion 41 of member 36 has one side effectively acted upon by atmospheric pressure and the opposite side 62 exposed to the pressure downstream of the valve means.

As previously mentioned, bleed passage 26 provided in member 36 provides a continuous limited flow through unit 10 from its inlet to its outlet connections. When spindle 14 is clear of the work and its orifices 20 are exhausting to atmosphere pressure drop occurs across restrictor 33 and a reduced pressure condition exists in passage 26 downstream of valve means 25 and against the inward face of portion 41 of member 36. Under this condition the force of spring 54 is sufficient to urge member 36 to the left and engage flow controlling surface 35 with valve seat 34 to restrict the flow. Thus, when the circuit is not active in gaging only limited bleed flow takes place.

Upon insertion of spindle 14 into a bore a pressure rise occurs downstream of valve means 25 which acts against surface 62 and is sufficient to open the valve means fully by retracting member 36. A further increase in pressure is then obtained in passage 26 which maintains member 36 retracted. The pressure drop downstream of restrictor 33 when spindle 14 is removed from the work allows spring 54 to close the valve means. Through adjustment 55 the compression of spring 54 is controlled so that the opening occurs at a pressure level below that existing during gaging and valve means 25 is maintained completely open under gaging conditions.

Thus, it is seen that a compact and simply constructed unit has been provided for insertion into the circuit of existing gaging systems for air economy when the circuit is inactive in gaging. The unit is automatically operable to provide full flow for gaging operations and to reduce flow when the gage head is exposed. This also serves to avoid objectionable noise between gaging operations. Through the adjustment provided the level of operation of the unit can be set as desired for various operations.

While the form of apparatus herein described constitutes a prefererd embodiment of the invention, it is to be understood that the invention is not to be limited to this precise form of apparatus and that changes may be made therein without departing from the scope of the invention which is defined in the appended claims.

What is claimed is:

1. An air economizer unit for mounting in the flow path of a pneumatic gaging circuit having a gage head providing relatively small resistance to fluid flow when not applied in gaging, said unit including a body providing a flow passage, inlet and outlet connection means at the respective ends of said flow passage for connecting the unit into the flow path of the gaging circuit, valve means in flow controlling relation with said flow passage, passage means providing a limited bleed flow from the inlet to the outlet connection means of the unit when the valve means is closed, and actuating means responsive to pressure downstream of said valve means operative to open said valve means at a pressure level below the gaging range and above that existing when the gage head is not applied in gaging and to maintain the valve means fully open throughout the gaging range and completely closed at pressures below said pressure level to provide only a limited bleed flow under non-gaging conditions.

2. An air economizer unit for mounting in the flow path of a pneumatic gaging circuit having a gage head providing relatively small resistance to fluid flow when not applied in gaging, said unit including a body providing flow passage means, inlet and outlet connection means at the respective ends of said flow passage means for connecting the unit into the flow path of the gaging circuit, said passage means including parallel passages communicating between the inlet and outlet connection means, one of said passages being a relatively small constantly open limited bleed passage, valve means in the other of said passages, and actuating means responsive to pressure downstream of said valve means for maintaining the valve means fully open during gaging and fully closed to provide only a limited bleed flow under non-gaging conditions.

3. An air economizer unit for mounting in the flow path of a pneumatic gaging circuit between the outlet of a gaging instrument and a gage head providing relatively small resistance to fluid flow when not applied in gaging, said unit including a body providing a flow passage, inlet connection means at one end of the flow passage for connection to the outlet of the instrument, outlet connection means at the other end of the flow passage for connection to the gage head, whereby the unit is connected into the flow path of the gaging circuit, valve means in flow controlling relation with said flow passage including a valve seat and a movable flow controlling member engageable therewith to prevent flow through the valve means, resilient means cooperating between said body and said member urging said member into flow preventing engagement with said seat, means in said unit providing a bleed passage from the inlet to the outlet connection means of the unit for a limited flow when said valve means is closed, and actuating means acting in opposition to said resilient means responsive to pressure downstream of said valve means operative to move said member away from said seat at a pressure level below the gaging range and above that existing when the gage head is not applied in gaging, to maintain said member fully retracted throughout the gaging range and to allow full closure of the valve means by said resilient means at pressures below that level.

4. An air economizer unit as set forth in claim 3 further comprising adjustable means cooperating with said resilient means to determine the pressure level at which said valve means is actuated.

5. An air economizer unit for mounting in the flow path of a pneumatic gaging circuit having a gage head providing relatively small resistance to fluid flow when not applied in gaging, said unit including a body providing a flow passage, inlet and outlet connection means at the respective ends of said flow passage for connecting the unit into the flow path of the gaging circuit, valve means in flow controlling relation with said flow passage including a valve seat, a flow controlling member supported in said body for movement toward and from flow restricting engagement with said seat, force applying means acting between said body and said member urging said member toward said seat, means providing a bleed passage from the inlet to the outlet connection means of the unit for limited bleed flow when said member engages said seat, said flow controlling member having an enlarged actuating surface exposed on one side to pressures downstream of the valve means for operation in opposition to said force applying means to open said valve means at a pressure level below the gaging range and above that existing when the gaging head is not applied in gaging and to allow closing of the valve means by said force applying means at pressures below that level.

6. An air economizer unit for mounting in the flow path of a pneumatic gaging circuit having a gage head providing relatively small resistance to fluid flow when not applied in gaging, said unit including a body providing a flow passage, inlet and outlet connection means at the respective ends of said flow passage for connecting the unit into the flow path of the gaging circuit, valve means in flow controlling relation with said flow passage including an annular seat and a flow controlling member cooperating therewith, said flow controlling member including a flow controlling portion at one end slidably guided for movement toward and from engagement with said seat and a relatively enlarged portion adjacent the other end of the member, a flow restrictor in said unit upstream of said valve means, spring means cooperating between said body and said member urging said flow controlling surface toward engagement with said seat, means providing a bleed passage around said valve means from the inlet to the outlet connection means of the unit providing a constant limited bleed flow, a diaphragm in sealed supporting relation between the enlarged portion of the flow controlling member and the body of the unit, said body having an opening exposing one side of the diaphragm to atmospheric pressure, the other side of said enlarged portion being exposed to the pressure downstream of said valve means actuating in opposition to said spring means, whereby said flow controlling member is moved in a direction to fully separate said valve seat and cooperating flow controlling surface and open said valve means at a predetermined pressure level downstream of the valve means and to maintain the surfaces in flow restricting engagement at pressures below that level.

7. A unit as set forth in claim 6 further comprising adjustable means cooperating between one end of said spring means and said body to adjust the resilience thereof and to control the level of actuation of said valve means.

8. A unit as set forth in claim 6 wherein said bleed passage is provided through said flow controlling member.

References Cited in the file of this patent
UNITED STATES PATENTS

| | | |
|---|---|---|
| 2,486,052 | Moore | Oct. 25, 1949 |
| 2,581,429 | Meyer | Jan. 8, 1952 |
| 2,593,957 | Aller | Apr. 22, 1952 |
| 2,655,041 | Jacobson | Oct. 13, 1953 |